(12) United States Patent
Dillon et al.

(10) Patent No.: US 6,430,233 B1
(45) Date of Patent: Aug. 6, 2002

(54) SINGLE-LNB SATELLITE DATA RECEIVER

(75) Inventors: Douglas M. Dillon, Gaithersburg; A. Roger Hammons, Jr., North Potomac; Feng-Wen Sun, Germantown, all of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/385,941

(22) Filed: Aug. 30, 1999

(51) Int. Cl.[7] .............................................. H04L 27/14
(52) U.S. Cl. ......................... 375/316; 725/68; 725/69; 725/71; 725/85; 725/110; 725/131; 455/3.02
(58) Field of Search ........................ 375/316; 455/3.02, 455/3.06; 725/68, 69, 70, 71, 85, 110, 127, 131, 139, 141, 151, 153

(56) References Cited

U.S. PATENT DOCUMENTS

| | | | | |
|---|---|---|---|---|
| 5,301,352 A | * | 4/1994 | Nakagawa et al. | 455/132 |
| 5,565,805 A | * | 10/1996 | Nakagawa et al. | 327/99 |
| 5,594,936 A | * | 1/1997 | Rebec et al. | 455/3.02 |
| 5,805,975 A | * | 9/1998 | Green et al. | 455/12.1 |
| 5,844,948 A | * | 12/1998 | Ben-Efraim et al. | 332/125 |
| 5,940,737 A | * | 8/1999 | Eastman | 455/13.1 |
| 5,959,592 A | * | 9/1999 | Petruzzelli | 343/756 |
| 6,029,044 A | * | 2/2000 | Arsenault et al. | 455/12.1 |

FOREIGN PATENT DOCUMENTS

EP  0 521 732 A  1/1993

* cited by examiner

Primary Examiner—Chi Pham
Assistant Examiner—Khanh cong Tran
(74) Attorney, Agent, or Firm—John T. Whelan; Michael W. Sales

(57) ABSTRACT

A satellite data receiver, a satellite data receiver controller, a method, an article of manufacture, and a propagated signal, which process polarization information from another satellite data receiver in order to permit multiple types of signals to be received by a conventional outdoor unit of a satellite reception system. The satellite data receiver, satellite data receiver controller, method, article of manufacture, and propagated signal also utilize decoding techniques to ensure no data is lost during a polarization switch. The satellite data receiver, satellite data receiver controller, method, article of manufacture, and propagated signal provide upgraded service without upgrading the outdoor unit and without requiring an installer to enter the consumer's home.

47 Claims, 10 Drawing Sheets

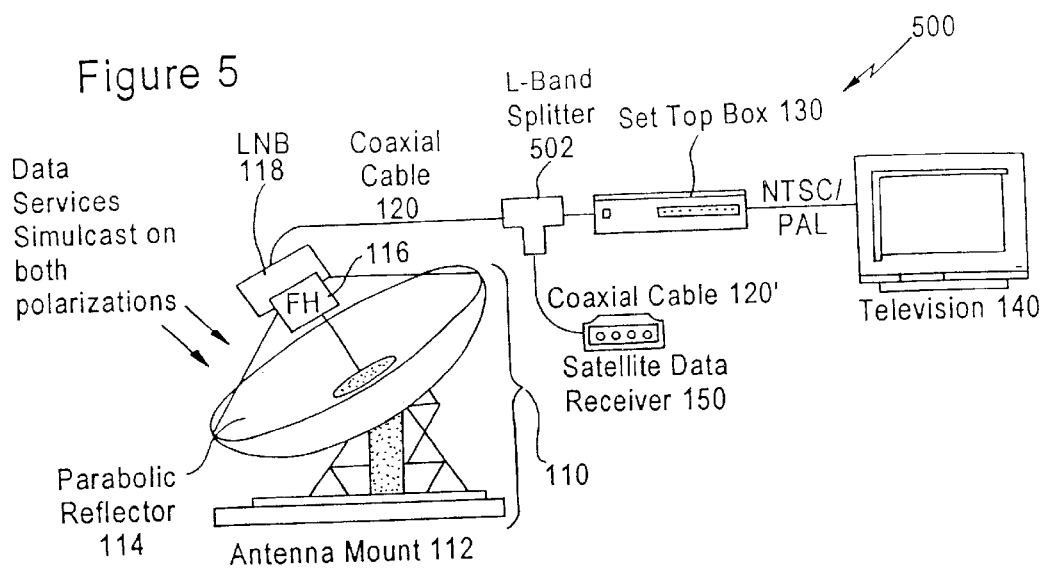
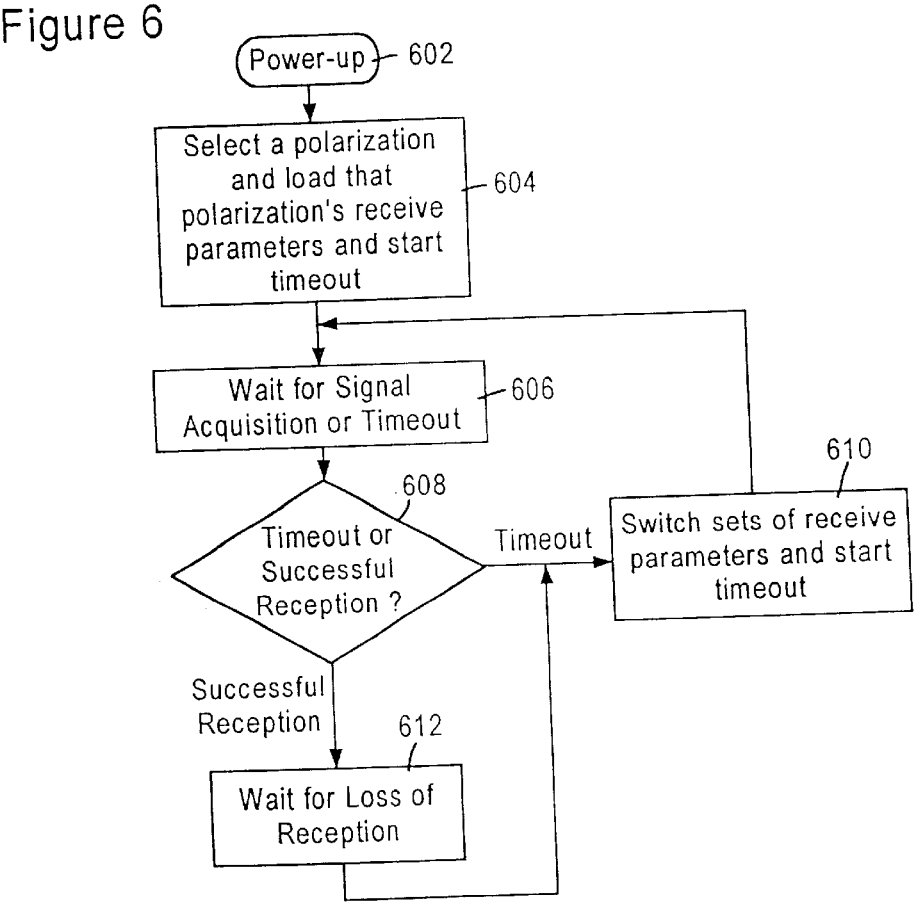

Sorted Acquisition Time for 93
DIRECTV System set-top Box Channel Changes

SINGLE-LNB SATELLITE DATA RECEIVER

BACKGROUND OF THE INVENTION

1.1 Field of the Invention

The present invention relates generally to the transmission of data services over a geosynchronous satellite communications network, and more, in particularly, relates to the transmission of services to satellite communications networks having Direct-To-Home (DTH) satellite receivers including a single-LNB (Low-Noise Block) in the outdoor unit (ODU) antenna assembly.

1.2 Description of Related Art
1.2.1 Direct-To-Home Satellite Television Reception As is well known in the art, the signals broadcast from a geosynchronous, DTH satellite are sent on one of two polarizations, which allows two sets of signals to be carried by one frequency band. In order to receive an analog TV program or digital carrier, a receiver must select the proper polarization (rejecting all signals on the other polarization) and tune to the appropriate frequency.

FIG. 1 illustrates the receive portion 10 of a typical satellite DTH satellite system.

A home is typically equipped with:

An ODU 11 including:
   An antenna mount 12, which holds the remainder of the ODU 11 in a fixed position so that signals can be received from a single, geosynchronous orbital position.
   A parabolic reflector 14, which gathers received signals from a single geosynchronous orbital position and passes the concentrated signals to a feed horn (FH) 16.
   FH 16 takes the concentrated signals from the parabolic reflector 14 and passes them to a single-LNB 18.
The Single-LNB 18:
   selects one of the two sets of polarized signals from the geosynchronous orbital position at the direction of a set-top box 13.
   low-noise amplifies the complete frequency band,
   translates the amplified signals to L-Band (e.g. 950 Mhz to 2150 MHz) and
   passes the resulting signals via a coaxial cable 17 to the set-top box 13.
The Coaxial Cable 17 carries the L-band satellite receive signals to the set-top box 13. The coaxial cable 17 carries power and polarization selection from the set-top box 13 to the single-LNB 18.
The Set-Top Box 13 allows the end-user of TV 14 to select a single TV channel from those receivable by the ODU 11. The set-top box 13 converts the TV channel from its satellite broadcast form to the form accepted by an unmodified broadcast television (e.g. NTSC or PAL) and passes the signal to the TV 14.

The set-top box 13 passes the polarization selection to the single-LNB 18 through the coaxial cable 17 in different ways, depending on the type of single-LNB 18. Some single-LNBs receive the desired polarization by detecting the presence or absence of a 22 kHz tone on the coaxial cable 17. Other single-LNBs receive the desired polarization by measuring the dc voltage received on the coaxial cable 17. Still other single-LNBs receive the desired polarization in other ways, but always from signals on the coaxial cable 17.

FIG. 1 describes a vast majority of the over 40 million Direct-To-Home receivers currently in use. A major cost factor with the system in FIG. 1 is that the installation of the ODU 11 and coaxial cable 17 is typically beyond what a normal consumer would consider doing on their own and is typically done at significant expense by a professional installer.

1.2.2 Digital Satellite Direct-To-Home Systems

As is well known to those skilled in the art, typical DTH systems are designed so that multiple digital services (e.g. television, audio and other services) are multiplexed into a single multimegabit per second digital carrier. The multiplexing is performed by means of fixed-length packets such as the 188-byte packets defined by what is known as the MPEG-2 transport system and as defined in the International Standards Organization (ISO) standard ISO 13818 Part 1, the contents of which are hereby incorporated by reference. Forward error-correcting codes are utilized at the bit level so that, under normal weather conditions, data is virtually never lost.

Each 188-byte MPEG-2 transport packet contains an address field, referred to as a program identifier (PID), which uniquely identifies the service carried by the packet. Digital DTH systems deliver a service's packets in order even though the multiplexing and remultiplexing of services may result in the resequencing of packets from different services.

Digital Video Broadcast (DVB), a European standards body, has defined standards for carrying data services over MPEG-2 transport systems. Three of these standards are:

Data Piping—where an individual packet ID (PID) carries a byte stream within the 184 byte payload field of the 188-byte MPEG packets.
   Data Carousel—the DVB standard multicast file transfer mechanism where given files are repeatedly transmitted so that if the receiver is unavailable when a file is first transmitted or the first reception is errored, the receiver can come back and receive a substantial transmission.
   Multiprotocol Encapsulation—where collections of internet protocol (IP) packets, typically IP multicast packets, are carried within the payload fields of MPEG packets in a standard way.

1.2.3 Digital Satellite Direct-To-Home Data Services

Various kinds of data services can be delivered to end-users via digital satellite DTH systems. These services can typically be categorized as follows:

Multicast file transfer—the delivery of complete files of digital data containing software, Internet Web pages, digital music, etc. For most multicast file transfers, the data is not extremely real-time. That is, the transmitter has some flexibility regarding when the multicast file transmission takes place. A partial or errored reception of a multicast file transfer is of no use to the receiver.
   Carousel—this is a variation on the multicast file transfer where given files are repeatedly transmitted so that if the receiver is unavailable when a file is first transmitted, or the first reception is errored, the receiver can come back and receive a subsequent transmission.
   Streaming multicast media—examples of this category include streaming digital audio and video. Streaming multicast media contains a characteristic whereby a user typically joins a stream in the middle of its transmission, and the transmission is useful even when not received completely from beginning to end and even in the presence of occasional errors.
   Unicast alert—examples of this include sending of "pages" or e-mail arrival notifications. This category is exemplified by the transmission of a small number of packets to a single end-user where the data transmitted must be received by the intended user with high-probability. Often unicast alerts are made robust against transmission errors by means of repeat transmission.

These kinds of data services can be carried either natively via data piping or data carousels or some other similar mechanism or can be carried via IP packets and multiprotocol encapsulation.

1.2.4 Digital Satellite Reception

FIG. 2 illustrates the digital reception part 20 of a typical digital satellite receiver 23.

The digital reception part 20 includes an ODU 11, a coaxial cable 17, and a digital satellite receiver 23. The ODU 11 further includes an antenna mount 12, a parabolic reflector 14, an FH 16, and an LNB 218. The digital satellite receiver 23 further includes a tuner 232, a demodulator/forward error correcting (FEC) decoder 234, and a controller 236.

As discussed above with respect to FIG. 1, the LNB 218 translates the signals from the satellite to L-band. As is well known to those skilled in the art, a particular LNB somewhat inaccurately performs this translation. The combination of unit-to-unit and temperature variation typically allows the translation to be inaccurate by approximately ±4 MHz.

The term "acquire", in the context of satellite digital receivers, refers to the process of obtaining successful reception of a digital carrier. When a signal is "acquired", it is being received. If acquisition is lost, then the signal is no longer being received and must be re-acquired.

In order to acquire a typical satellite digital carrier, the receiver 23 must have a specification of the kind of signal it is attempting to receive. Herein, the term receive parameters refers to this specification for a digital carrier. For DTH digital satellite carriers which conform to Digital Video Broadcast (DVB) standards, the set of receive parameters may include the polarization, symbol rate, the FEC rate and frequency. Some satellite receivers 23 can determine the FEC rate dynamically and therefore, this need not be specified.

In order to acquire a typical satellite digital carrier, the receiver 23 must tune precisely to the frequency of the carrier as it passed to the carrier by the coaxial cable 17. In order to retain acquisition, the receiver 23 must precisely track the frequency of the carrier as seen by the demodulator/FEC decoder 234.

The tuner 232 of the digital satellite receiver 23 selects a single portion of the entire L-band received from the LNB 218, translates it to a single center frequency (typically baseband), and forwards it (as signal 231) to the demodulator/FEC decoder 234. The controller 236 of the digital satellite receiver 23 controls the tuner 232 to select the frequency to be "tuned".

The demodulator/FEC decoder 234 then attempts to precisely match the tuned frequency to match the center frequency of the digital carrier to be received. The demodulator/FEC decoder 234 commands the tuner 232 to make small adjustments to the tuned frequency by sending an automatic frequency control (AFC) signal 233 to the tuner 232.

When the receiver 23 is first attempting to acquire a carrier, the controller 236 coordinates the acquisition by commanding the tuner 232 and demodulator/FEC decoder 234 to successively search the range of frequency uncertainty caused by the LNB's 218 inaccurate translation. The search is commanded to take place in the form of a series of fixed-width frequency steps. For each search step, the demodulator/FEC decoder 234 then searches for the signal adjusting the AFC signal to search the frequency range within the step.

The demodulator/FEC decoder 234 reports signal reception status to the controller 236. When acquisition is obtained and completes successful reception, the demodulator reports to the controller 236 its estimate of the signal's center frequency within the tuning step set by the controller 236. The controller 236 can thus calculate the frequency offset, which is the difference between where the signal should be, given perfect translation by the LNB 218 and tuner 232, and where the signal actually is.

The controller 236 uses this frequency offset to speed reacquisition when the satellite receiver 23 is switching from one digital carrier to another, perhaps on a different polarization. The controller 236 can use the frequency offset to command the tuner 232 and the demodulator/FEC decoder 234 to search for the new signal within a much smaller region of uncertainty. The result is that it takes a much shorter time to acquire the signal than would be possible when searching the entire range of frequencies possible with LNB translation error.

1.2.5 Packet-Level Forward Error Correcting Codes

As is well known to those skilled in the art, FEC codes are useful for increasing the reliability of transmission across error-prone transmission channels. Packet-level FEC codes are useful on packet networks where there is an intolerable level of packet loss, but lower layer protocols prevent the processing of errored packets by detecting and discarding errored packets. Packet-level FEC codes need only correct loss of packet (erasures) and need not correct errored packets.

Repeat transmission is the simplest form of packet-level FEC. Each packet is sent multiple times so that the satellite data receiver 20 need only receive one of the various transmissions.

Exclusive-OR parity is another simple form of packet-level FEC, which works well with equal length packets and can easily be extended to work with variable-length packets. With exclusive-OR parity, a parity packet is formed by calculating the Exclusive-OR sum of a group of packets. Any single lost packet may be reconstituted by calculating the Exclusive-OR sum of the parity packet and all of the group's other packets.

Exclusive-OR parity can handle single, isolated lost packets. Many communications channels do not experience isolated packet loss. Instead they experience bursts of errors where many or all packets are lost for a period of time. As is well known to those skilled in the art, interleaving may be used to make a burst of errors have an effect similar to a series of isolated packet losses and, as a result, be correctable by error-correcting codes.

A simple form of Exclusive-OR parity combined with interleaving is referred to herein as Blocked Exclusive-OR Parity FEC. Blocked Exclusive-OR Parity FEC is illustrated in FIG. 3. The interleaving groups each set of N packets together as a single block and then performs Exclusive-OR parity on each group of M blocks. FIG. 3 illustrates a sample rate 3/4 blocked exclusive-OR parity FEC where the block size is 6 packets and where the exclusive-OR parity FEC is one parity packet for every 3 data packets. Any burst loss of less than or equal to 6 packets can be corrected provided the burst loss occurs no more frequently than once every 24 packets. In general, this code can correct any single burst loss of less than N packets out of any M*N packets.

As is well known to those skilled in the art, advanced packet-level FEC codes may be constructed so that a file can be reconstituted with extremely high-probability provided the overall packet loss rate is less than a designed threshold regardless of the set of packets lost.

1.3 Direct-To-Home Satellite Television/Data Reception

FIG. 4 illustrates the conventional home system 30 required where data reception and television reception are required simultaneously. FIG. 4 is very similar to FIG. 1, with the exception of the addition of a second coaxial cable 17' and a satellite data receiver 15, and the replacement of the single LNB 18 with a dual LNB 318.

These modifications are required as the satellite data services are typically transmitted on a single, unchanging polarization while the set-top box 13 is changing its LNB's polarization from moment to moment as it the viewer changes channels.

In order to upgrade from the receiver 10 of FIG. 1 to the system 30 of FIG. 4, the receiver 10 requires three non-trivial expenses beyond the addition of the satellite data receiver 15:

1. Replacement of the single-LNB 118 with the dual LNB 318, which means an additional hardware cost.
2. Addition of a second coaxial cable 17', which also means an additional hardware cost.
3. Professional installation of 1 and 2, which is an additional cost and also requires the homeowner to be available to let the installer in.

With modem satellite data receivers 15, the above expenses exceed the cost of the satellite data receiver 15 and, combined with the inconvenience of letting the installer in have been a major obstacle to the successful launch of broadcast satellite consumer data services.

SUMMARY OF THE INVENTION

The present invention solves the above identified problems with conventional home receiver systems by providing a satellite data receiver and/or satellite data receiver controller, which eliminates a need to upgrade the outdoor unit and which does not require an installer to enter the consumer's home.

The present invention, in its various embodiments, is directed to a satellite data receiver, a satellite data receiver controller, a method, an article of manufacture, and a propagated signal, which permits the user of a conventional satellite television system to receive data services, other than televised signals, without upgrading their outdoor unit or requiring an installer to be let in to the consumer's home. The satellite data receiver and/or satellite data receiver controller of the present invention achieves this goal by performing one of the following functions:

- tracking another receiver's polarization selection signals and receiving data simulcast on carriers on each of the polarizations;
- tracking another receiver's polarization selection without monitoring the polarization selection signals by searching for a simulcast transmission on the receiver parameters for a pair of carriers, one on each polarization;
- tracking another receiver's polarization selection signals and, in most cases, passing the track selection signals to the single LNB, but in some cases, overriding the selection signals; or
- tracking a first satellite data receiver's acquisition status and setting the satellite data receive parameters in such a way as to track the polarization shifts from a second satellite receiver and allow reception of data services simultaneously transmitted on both polarizations.

In some embodiments of the present invention, the functionality which permits the satellite data receiver and/or satellite data receiver controller to execute the above functions is built in; in other embodiments, the functionality is loaded via conventional software program or downloaded via a propagated signal.

The present invention in its various embodiments also utilizes one of several error-correction decoding techniques in order to avoid data loss during a polarization switch. These decoding techniques include repeat transmission, exclusive-OR parity codes, blocked exclusive-OR parity codes, phase burst correcting array codes, general array codes, Reed-Solomon codes, low-density parody check codes, and cyclic codes.

BRIEF SUMMARY OF THE DRAWINGS

FIG. 5 illustrates a home system in one embodiment of the present invention, which monitors polarization control signals.

FIG. 6 is a flowchart which illustrates another embodiment of the present invention, which does not monitor polarization control signals.

DETAILED DESCRIPTION OF THE PREFERRED EMBODIMENTS

Figure 1:
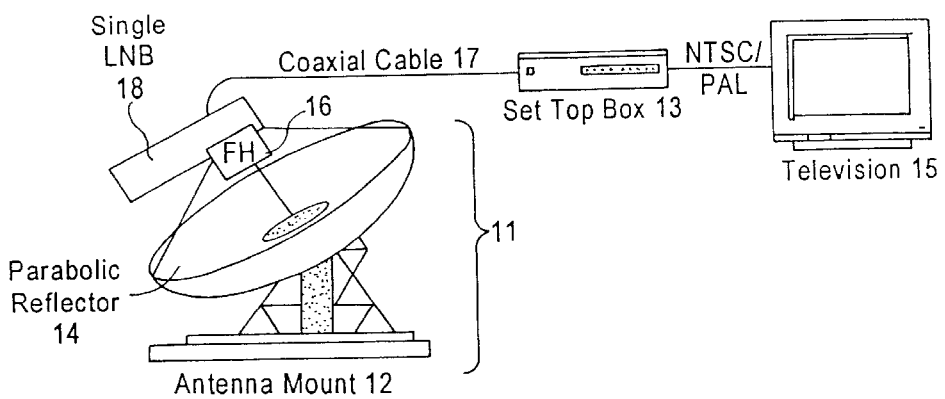
FIG. 1 illustrates a conventional DTH receiver system.

The present invention eliminates the cost and inconvenience of upgrading a single-LNB and installing a second coaxial cable from the ODU to indoor equipment. As such, it makes possible a genuinely end user installable satellite data receiver. FIG. 5 illustrates the home system 500 in one embodiment of the present invention. The home system 500 includes an ODU 110, similar to the ODU 11 illustrated in FIG. 1, including an antenna mount 112, parabolic reflector 114, an FH 116, and a single-LNB 118. The home system 500 also includes a coaxial cable 120, set top box 130, a television 140, and a satellite data receiver 150. The home system 500 also includes an L-band splitter 502.

The L-band signal splitter 502 is used to give the satellite data receiver 150 access to both the received L-band signal from the single-LNB 118 as well as the signals from the set-top box 130 selecting the polarization forwarded by the single-LNB 118.

The data services are simultaneously transmitted on both polarizations. Typically in a DTH satellite system, there are multiple digital carriers on each polarization. The digital data services are located within one digital carrier on one polarization and in another digital carrier on the other polarization. The data services are multiplexed into their carriers along with other services (digital video, audio, etc.). The receive parameters of the digital carrier are specific to the carrier's polarization.

The satellite data receiver 150, in the preferred embodiment, monitors the polarization control signals from the set-top box 130. The satellite data receiver 150 tunes to the receive parameters appropriate to the polarization set by the set-top box 130 and thus appropriate for the L-band signals passed to the satellite data receiver 150. As the end user changes the television channel, which often results in a change of polarization, the satellite data receiver 150 retunes and thus able to receive data services regardless of the polarization selected by the set-top box 130.

2.1 Nonmonitoring Satellite Data Receiver

In another embodiment, the satellite data receiver 150 does not monitor the polarization control signals from the set-top box 130, rather the satellite data receiver 150 performs the functions outlined in FIG. 6. When the satellite data receiver 150 is unable to receive, it assumes that the set-top box 130 has switched to the other polarization and sets its receive parameters for the digital carrier on the other polarization. The receiver 150 thus attempts to receive the transmission on the other polarization. If it doesn't successfully acquire the carrier within a timeout it sets its receive parameters to those of the other polarization. For the normal case, loss of reception occurs when the set-top box 130 changes the polarization, and the satellite data receiver 150 appropriately tracks this change. When a weather outage occurs (or other failure causing loss of signal), the satellite data receiver 150 may not be on the correct set of parameters when the signal is restored. FIG. 6 shows that, within a time out, the satellite data receiver 150 will begin searching with the correct receive parameters, and the carrier will be acquired.

In more detail, in step 602, the satellite data receiver 150 is powered up. In step 604, one of the polarizations is selected and its receive parameters are loaded into the satellite data receiver 150 and a timeout is started. In step 606, the satellite data receiver 150 waits for signal acquisition or a timeout. In step 608, the satellite data receiver 150 determines whether the timeout or successful reception has occurred. If the timeout occurred, in step 610 the satellite data receiver 150 switches sets of received parameters and starts the timeout again and then returns to step 606. If successful reception occurred, in step 612 the satellite data receiver 150 waits for a loss of reception. Once the loss in reception occurs, the satellite data receiver 150 proceeds to step 610.

2.2 Satellite Data Receiver Which Sets Polarization

Figure 7:
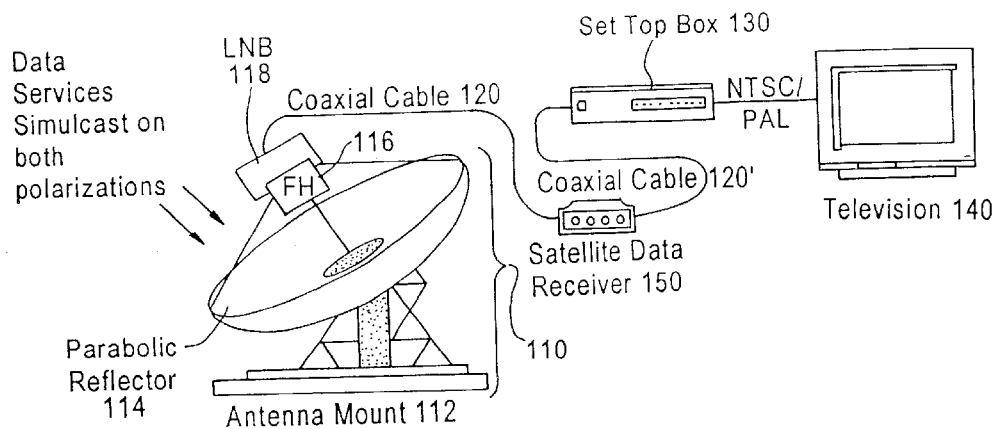
FIG. 7 illustrates an embodiment of the present invention where satellite data receiver sets its own polarization.

In another embodiment as illustrated in FIG. 7, the satellite data receiver 150 is located between the set-top box 130 and the single-LNB 118. In this embodiment, the satellite data receiver 150 forwards the L-band signals from the single-LNB 118 to the set-top box 130. The satellite data receiver 150 also receives, but does not forward, the polarization control signals from the set-top box 130. Instead, the satellite data receiver 150 generates its own polarization control signals, setting the single-LNB 118 polarization to its preferred position. The ability to set its own polarization setting, overriding the set-top box 130 if necessary, allows the satellite data receiver 150 to do the following:

Delay changing from one polarization to another as needed to avoid an unrecoverable amount of lost packets due to polarization shifts.

Override the set-top box 130 during periods of time when the television is unlikely to be used (e.g., the early morning hours). This override allows reception without FEC overhead and without simultaneous transmission during those periods of time.

2.3 Separate Satellite Data Receiver Controller Embodiment

Figure 8:
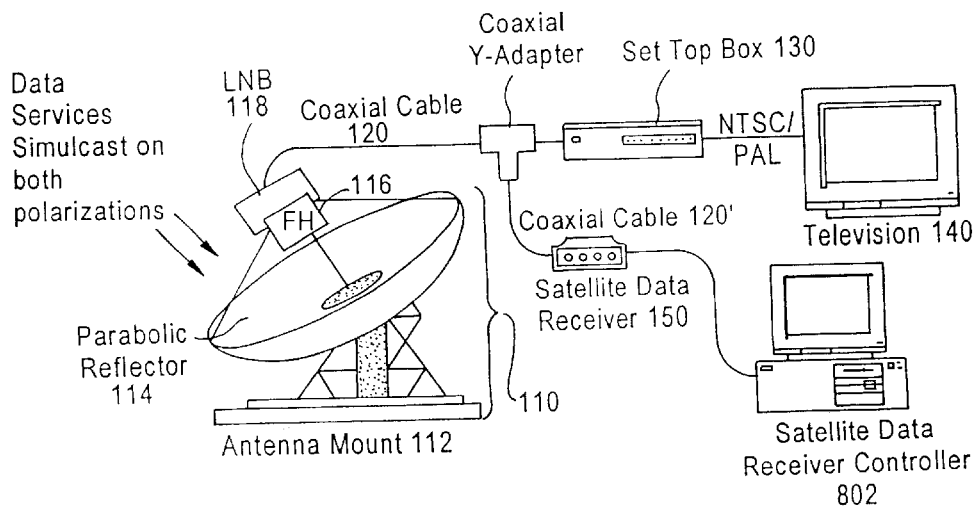
FIG. 8 illustrates an embodiment of the present invention including a satellite data receive controller.

As illustrated in FIG. 8, another embodiment of the present invention includes a separate satellite data receiver controller 802. This embodiment allows operation with an internally unmodified satellite data receiver 150. The satellite data receiver controller 802 may, in some cases, be a program or set of programs running on a personal computer (PC) which are loaded on the PC via either an article of manufacture or downloaded (via the Internet or via a satellite) as a propagated signal (with or without a carrier wave), as either entire programs or signals or in code segments. The satellite data receiver controller 802 receives acquisition status from the satellite data receiver 150 and provides the receive parameters to the satellite data receiver 150. The satellite data receiver controller 802 also receives and processes the resulting received data. In this embodiment, the satellite data receiver controller 802 performs the algorithm specified in FIG. 6. If packet-level FEC is performed, the satellite data receiver controller 802 also performs the FEC decoding function.

As is readily apparent to one skilled in the art, there are other similar embodiments where the functions of receive parameter selection, data reception, and FEC decoding may be distributed between a satellite data receiver 150 and another component that actually processes the resulting data.

2.4 Categories of Satellite Data Receiver

Figure 9:
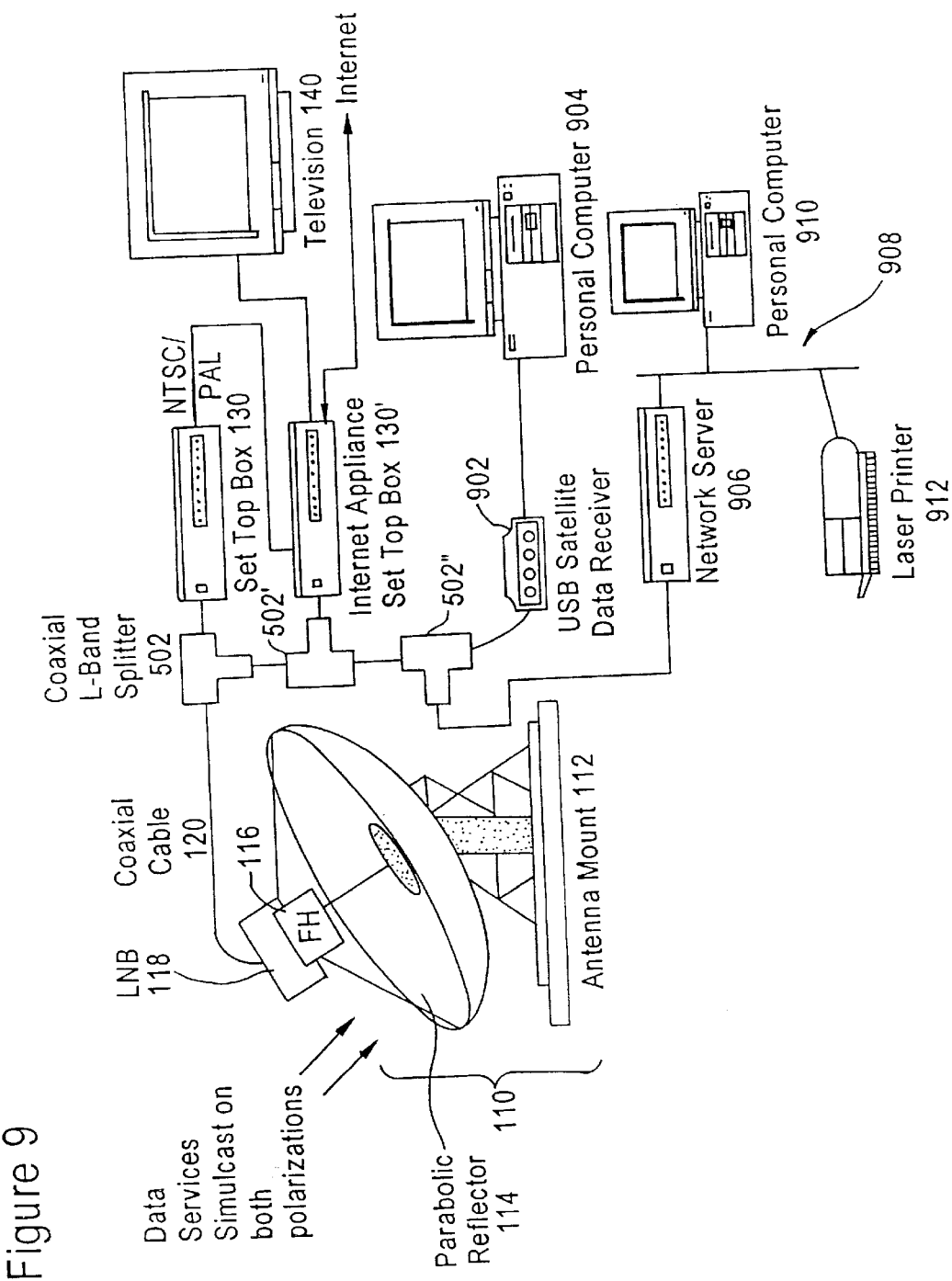
FIG. 9 illustrates additional hardware useable with the embodiments illustrates in FIGS. 5–8.

Various types of satellite data receivers may be used in the previous embodiments with respect to how the received data is processed and made available to the end user. FIG. 9 illustrates some of these receivers, assuming an L-band splitter embodiment as illustrated in FIG. 5. The variations illustrated in FIG. 9 are also applicable to the embodiment illustrated in FIGS. 6 and 7. The PC peripheral interface and network interface receivers are also applicable to the embodiment illustrated in FIG. 8.

The interfaces through which a satellite data receiver 150 might provide data services include:

1. Analog TV (NTSC, PAL, etc.)—An example of such a receiver is a second set-top box 130' that provides satellite broadcast data services to the TV along with optional services including interactive Internet access, digital video recording/playback of the TV set-top's output, etc.

2. Personal computer peripheral interface—Examples of such a receiver include a universal serial bus (USB) receiver 902, a plug-in card adapter such as a PCI bus adapter card or a firewire peripheral which interfaces to personal computer 904.

3. Network interface—An example of such a receiver is a network server 906 that provides broadcast data services (and other optional services) to devices located on a network such as an Ethernet 908 including personal computer 910 and laser printer 912. Other networks envisioned include a wireless local area network (LAN), a phone line home LAN or a power line home.

Combination receivers are also possible that provide received data services to users through two or more of the above described interfaces.

2.5 Acquisition of Polarization Change

Figure 10:
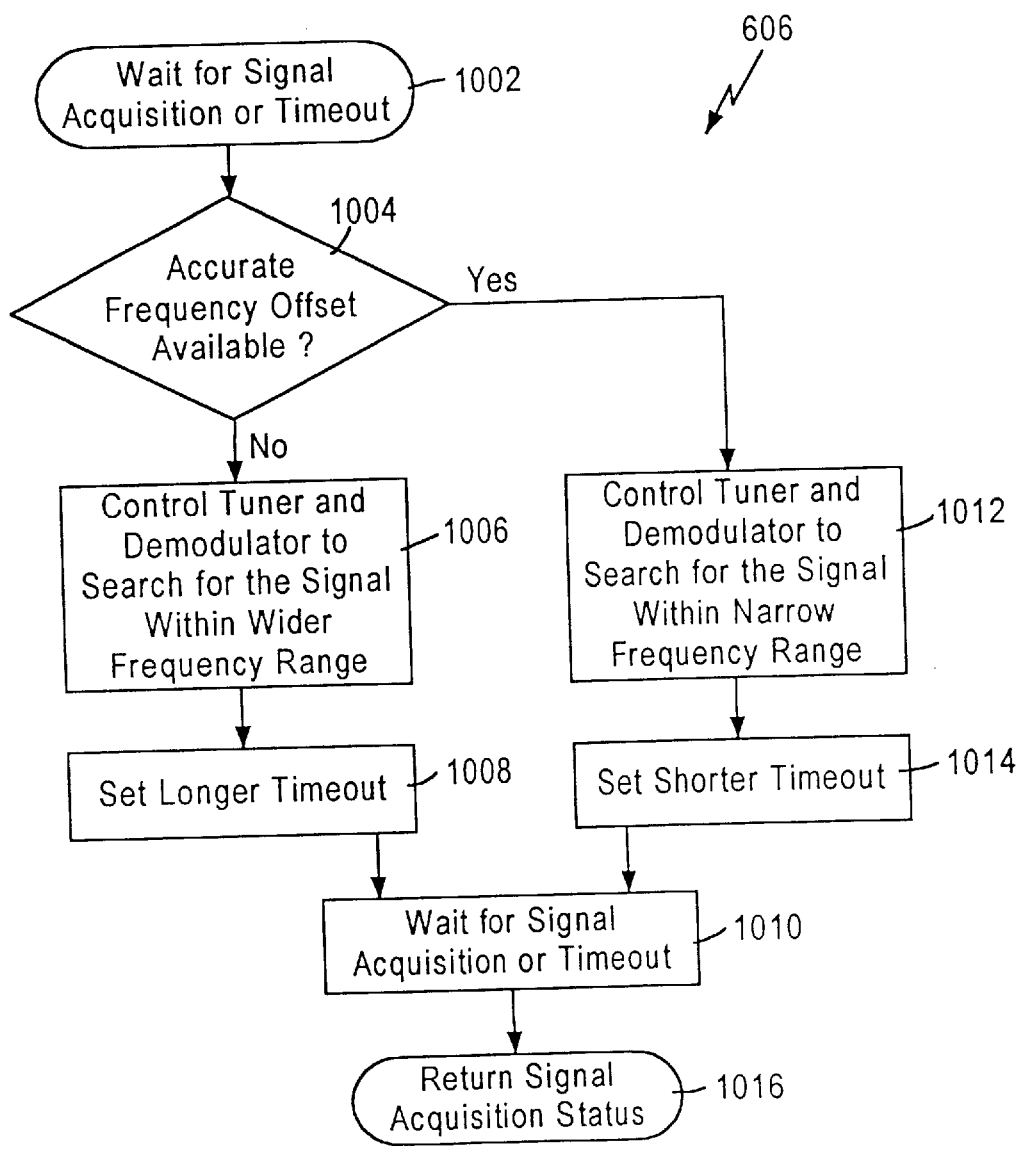
FIG. 10 is a flowchart which illustrates the steps to attempt to acquire a carrier on another polarization.

FIG. 10 is a flowchart that details the algorithm used by the satellite data receiver 150 to acquire the carrier on the other polarization. This may occur, depending on the embodiment, either after a change in monitored polarization signals or, in the case where the satellite data receiver 150 does not monitor the set-top box's 130 polarization control signals, after a suspected polarization shift. In particular, FIG. 10 illustrates the details of step 606 of FIG. 6.

Step 1002 is the entry to the flowchart and describes the processing done by FIG. 10 as a whole. The satellite data receiver 150 waits for signal acquisition or timeout. In step 1004, the satellite data receiver 150 determines whether an accurate frequency offset is available. If not, the satellite data receiver 150 proceeds to step 1006 and controls the tuner 232 and demodulator 234 of the satellite data receiver 150 to search for a signal within a wider frequency range. In step 1008 the satellite data receiver 150 sets a longer timeout, and in step 1010 waits for signal acquisition or timeout. If an accurate frequency offset is available in step 1004, the satellite data receiver 150 controls the tuner 232 and the demodulator 234 to search for the new signal within a narrow frequency range in step 1012 and sets a shorter timeout in step 1014, and waits for the signal acquisition or timeout in step 1010. Finally in step 1016, the satellite data receiver 150 returns the signal acquisition status.

An accurate frequency offset is available when acquisition was just recently lost and is unavailable when it has been some number of seconds since the signal was acquired. The "wider frequency range" in step 1006 refers to the range of frequency necessary to accommodate the entire unit-to-unit and frequency variation in the single-LNB's signal translation. The "narrow frequency range" in step 1012 refers to the range of frequency necessary to accommodate the inaccuracy of the demodulator's estimate of its AFC adjustment to the tuned frequency. It is also wide enough to cover other minor sources of variation including inaccuracies in the transmitted carrier frequency and frequency translation variations from among the transponders located within a single satellite orbital position.

2.6 Channel Packets Loss Characteristics

In the present invention, data services are simultaneously transmitted on both polarizations. When the set-top box 130 changes polarization because the user is changing channels, the satellite data receiver 150 experiences a brief burst of lost packets.

Figure 11:
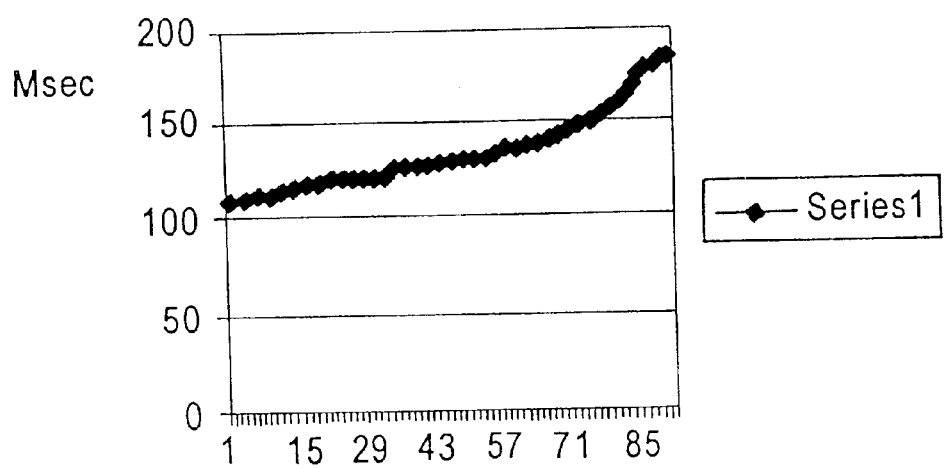
FIG. 11 is a plot of the experimentally measured time required to reacquire the satellite signal.

FIG. 11 plots the results of an experiment where the time to reacquire the satellite signal was measured for 93 channel changes on a Hughes Network Systems (HNS) manufactured DIRECTV System set-top box. From this it can be concluded that a single-LNB data receiver using similar satellite receiver technology should be able to detect an LNB polarization change and acquire the simulcast transmission on the other polarization within 200 msec.

Another experiment with the same DIRECTV System set-top box involved changing the TV channel 16 times as fast as possible with the set-top box remote control by using the channel up and channel down buttons. The LNB polarization changed nine times or roughly 50% of the time (as expected). The time between LNB changes varied between a minimum of 1.0 second to a maximum of 7.3 seconds. From this it can be concluded that the minimum time between LNB changes experienced by a single-LNB data receiver will be 1.0 second.

Table 1 provides sample packet loss characteristics for the channel as seen by a single-LNB data receiver. Table 1 is based on the above experimental results and reasonable assumptions about channel surfing behavior.

TABLE 1

Sample Packet Loss Characteristics

| Packet Loss | Channel Characteristics |
|---|---|
| 0.2 | Second to resume reception on polarization change |
| 1 | Worst-case second between polarization changes when a user is "channel surfing" |
| 0.20 | Maximum packet loss rate in a 1-second period |
| 15 | Typical maximum number of channel changes in a 30-second period |
| ½ | Fraction of channel changes that are actually polarization changes |
| 8 | Typical maximum number of channel polarization changes in a 30-second period |
| 0.05333333 | Typical maximum packet loss rate in a 30-second period |
| 2 | Maximum expected channel changes per minute, long-term |
| 1 | Maximum expected polarization changes per minute, long-term |
| 0.0033 | Maximum expected packet loss rate, long-term |

2.7 Use of Blocked Exclusive-Or Parity Packet-level FEC

As can be seen from Table 2, even a simple, Rate 4/5 Blocked Exclusive-Or Parity FEC code can correct all lost packets resulting from polarization changes when the block size covers 0.2 second of transmission.

Table 2 defines the Rate 4/5 Blocked Exclusive-OR Parity block size as a function of channel bit rate to be used to recover from lost packets with the Rate 4/5 Blocked Exclusive-OR Parity FEC code when MPEG-2 188-byte packets are carrying the data services.

TABLE 2

Rate 4/5 Blocked Exclusive-OR Parity Block Size

| Bit Rate in Bits/Second | Packets per Second | FEC Block Size in Packets |
|---|---|---|
| 100,000 | 66.5 | 14 |
| 500,000 | 332.4 | 67 |
| 1,000,000 | 664.9 | 133 |
| 2,000,000 | 1329.8 | 266 |
| 5,000,000 | 3324.5 | 665 |
| 10,000,000 | 6648.9 | 1330 |

2.8 Use of Advanced Packet-level FEC Techniques

As seen from Table 1, more advanced FEC codes, capable of correcting a little more than 5% lost packets in a 30-second period can be used to achieve packet loss correction with even less overhead. Table 1 shows that an even lower overhead rate can be achieved when interleaving can be used to spread lost packets over the long term.

In the blocked Exclusive-OR parity packet-level FEC design, it is assumed that the channel is bursty, producing up to 0.2 seconds of lost packets (erasures) within a 1-second time interval due to user's channel surfing. Thus, in every 1-second time interval, there is at most one burst of erasures to be corrected. Under the assumption of one burst erasure of at most 0.2 seconds every one second interval, the simple blocked Exclusive-OR parity packet-level FEC scheme proposed in the prior section is, in fact, optimal.

The maximum erasure burst correction capability for any code is at most the redundancy r of the code. Cyclic codes have maximum correctable erasure burst length b=r so are always optimal, and as a class, they also admit simple erasure decoders by re-encoding. Mathematically, the blocked Exclusive-OR parity packet-level FEC code is a cyclic code based on the generator polynomial $g(x)=1+x^\lambda$, where $\lambda$ is the interleaving depth. In this application, one could have also selected any cyclic code of the desired rate and be able to achieve the desired level of erasure burst correction.

Over a longer time interval such as 30 seconds, the percentage of polarization changes is significantly less than the worst-case percentage within the 1-second time interval. Thus, if one interleaving is performed over a 30-second interval, the amount of redundancy of the packet-level FEC can theoretically be significantly reduced. For the nominal parameters given in Table 1, slightly more than 5 percent redundancy would be sufficient for a 30-second interleaving period. The required redundancy falls below 1 percent if interleaving is performed over an even longer period. Thus, a system designer can trade increased interleaver depth for lower FEC redundancy.

Similarly, it would be possible to implement the packet-level FEC with codes whose length is equal to that of the interleaver period. Such codes would be optimal in terms of erasure correction capability versus redundancy but would incur large decoder complexity. Therefore, shorter codes can be designed to trade off decoder complexity and FEC code efficiency. While the actual tradeoffs are system dependent, depending on a detailed evaluation of the channel conditions and their possible variation over time or variation from site to site, there are general design principles that guide such tradeoffs. These design principles are discussed below.

2.8.1 Scalability with Data Rate

The interleaving and FEC design should be matched to the statistical characteristics of the error events caused by the channel. In the present invention, the erasures are produced primarily by the user surfing from one channel to another. The time duration of error events and interval between distinct error events is independent of the communication rate of the data link. Since the communication rate is variable, the channel's statistics will also be variable when error events are measured in data bytes rather than seconds. Thus, the interleaving and FEC design must be flexible enough to account for the scaling of error event durations, etc., with data rate.

2.8.2 Interleaver Design

The interleaver is a processing element on the "transmit" side whereas the hardware illustrated in FIGS. 5 and 7–9 is on the "receive" side. The optimal interleaver is determined by the data rate, time to resume reception upon polarization change, and minimum duration between polarization changes when a user is "channel surfing." The minimum duration between polarization changes is typically a few times larger than the time to resume reception upon polarization change, which means that a burst is always followed by a significant amount of good data. This particular property is very useful in optimizing the interleaver. As is well known in the art, the purpose of interleaving is to spread good data so an FEC for random error correction can correct the erasures.

Figure 12:
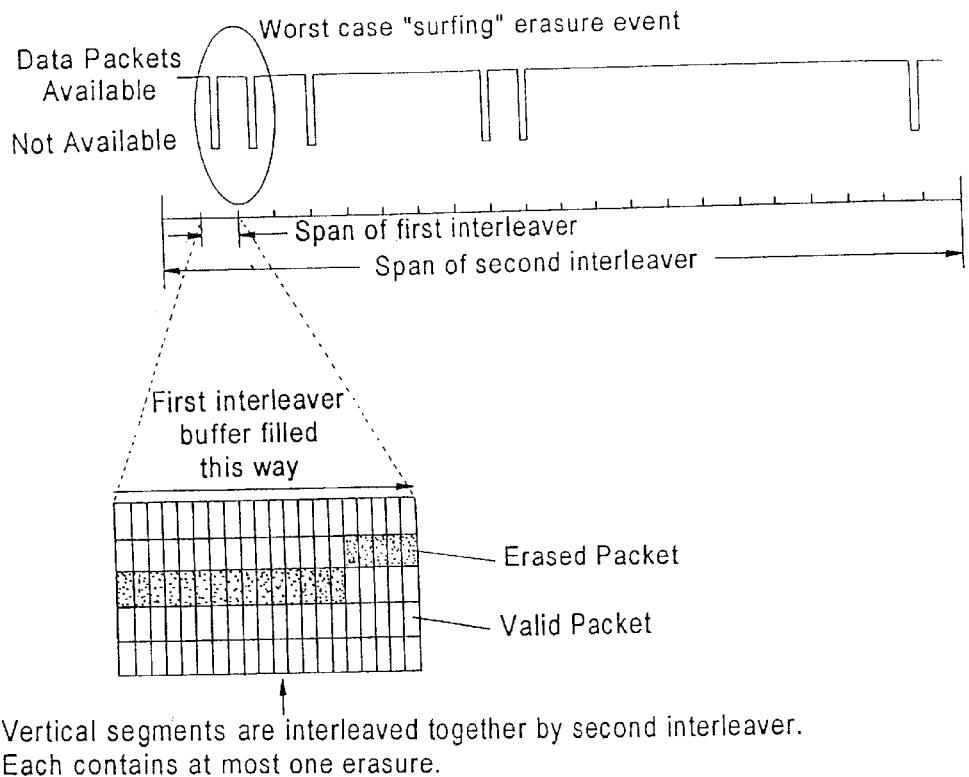
FIG. 12 illustrates an interleaver in one embodiment of the present invention.

The preferred embodiment interleaver, for applications that are not real-time, performs two-stage interleaving as illustrated in FIG. 12. The first stage interleaver is of length equal to the worst-case seconds between polarization change, when a user is "channel surfing" (1 second, as determined above). The first stage interleaver is a block interleaver, i.e., data is read into the matrix row-wise and then read out column-wise. Block interleavers are described in "Error Control Systems for Digital Communication and Storage," by Stephen B. Wicker, Prentice Hall, section 16.1. The length of the row is equal to time for resuming reception upon polarization change (e.g., 0.2 second). With this particular structure, each column of the matrix has, at most, one erased packet. As noted earlier, the function of interleaving is to blend good and bad packets evenly. Therefore, when interleaving is performed over a longer period, the column structure should not be broken. Instead, each column of the matrix should be considered as one entity.

The second-stage interleaving can be any conventional interleaver such that, at the output of the second stage interleaving, the outage events appear uniformly.

EXAMPLE 1

Assume that the data rate is 1 Mbps, i.e., worst-case seconds for surfing is 1 second and 0.2 second for polarization change. An interleaver of 30 seconds in length with packet length equal to 7 MPEG-2 packets, i.e., 10,528 bits per packet, is desired.

The first interleaver is 1 second in length, i.e., 95 packets. The entire interleaver spans 30*95=2850 packets (slightly more than 30 seconds for rounding effect). The first stage interleaver is a block interleaver of row length 19 and 5 columns. The matrix is filled with data packets by rows and read out by columns.

The preferred embodiment of the second stage interleave for this case interleaves over 2850/5=570=19*30 entities since each column of the first stage interleaver is treated as one entity. The second stage interleaver can be a block interleaver of 30 rows and 19 columns. Again, the 30×19 matrix is filled with the entries row by row and read out column by column.

2.8.3 Packet Layer De-Interleaver Implementation

The purpose of the de-interleaver is to restore the stream of packets back to their original order. In the preferred embodiment, a packet as received by the satellite data receiver 150 contains a sequence number defining its position prior to interleaving. The de-interleaver uses this sequence number to restore the packets back to their original order. Packets will typically appear to be out-of-sequence to the de-interleaver while an interleaving block is being received. Packets are forwarded to the FEC decoder 234 as a block when reception of an interleaving block is complete. Reception of an interleaving block is complete when either a packet from a subsequent block is received or after at least the time required to receive an interleaving block's worth of packets has elapsed since the reception of the first of the blocks packets.

The de-interleaver maintains an array of packets where the number of entries in the array is equal to the interleaver block size. Each array entry includes status information defining whether the entry is empty. The de-interleaver also maintains the sequence number of the first packet in the current interleaving block, where first in this case refers to the first packet positionally, not in order of reception. The de-interleaver also maintains the time when the first packet which is part of the current block was received. As packets are received, the de-interleaver subtracts the first packet in the block's sequence number from the sequence number in the packet to determine which array position the received packet should be stored in. If the difference is greater than or equal to the array size, the packet belongs to a subsequent block and the de-interleaver forwards all the packets in the array to the FEC decoder prior initializing the array and processing the received packet.

2.8.4 Selection of FEC Code Length and Error Correction Capability

Selection of the FEC code involves an understanding of the tradeoffs among error correction capability, decoding complexity, and efficiency (redundancy). Typically, decoding complexity increases with the length of a code; whereas, redundancy decreases with the length of a code in order to achieve the same error correction capability.

A typical design flow for selecting the parameters of FEC involves:

Translating the performance requirement into the maximal tolerable residual error rate after FEC decoding.

For a least redundancy design:
Fix the error correction capability
Find the maximum length of the code that provides satisfactory residual error rate after FEC decoding In order to perform these design tradeoffs, the residual error rate after FEC decoding for given error correction capability must be derived.

Assume that each entity in the second stage of interleaving consists of $N_1$ packets and the second interleaver spans over $N_2$ such entities. Therefore, there are $N_1 * N_2$ packets in each interleaving interval. Assume an FEC code of length n packets and it can correct r packet erasures. Preferably, $N_1 N_2$ is an integer multiple of n. Assume that the entities with erasure packets are randomly distributed after the interleaving. The residual error rate after FEC is upper bounded by (detailed deviation of the upper bound is presented in the next section)

$$\sum_{l=r+1}^{n/N_1} \binom{m}{l} \frac{1}{w^l} (1 - 1/w)^{m-l}, \tag{1}$$

where m is the maximum number of possible packet erasures within $N_1 * N_2$ packets and $w = N_1 * N_2/n$, the number of code words transmitted within one interleaver interval. The reason that this formula gives only an upper bound rather than the true error rate is due to the assumption that m is the maximum number of erasures that are possible. If m is in fact the actual number of errors that occurred, the formula gives the true error rate. Note that this upper bound is based on the assumption that the two-stage interleaving strategy is used. For ideal single-stage interleaving, the upper bound becomes $$\sum_{l=r+1}^{m} \binom{m}{l} \frac{1}{w^l} (1 - 1/w)^{m-l}. \tag{2}$$

Because the error rate is dominated by the first few terms, one observes that the difference between these two bounds is small. While this observation is true, one should not be misled into concluding that there is little advantage to the recommended two-stage interleaving approach. The upper bound for the single-stage interleaver assumes ideal random interleaving. An ideal interleaver must utilize knowledge about the distribution of error events. This implies that a good single-stage interleaver has to make use of the property that one burst of erasures will be followed by a period of good packets. The two-stage interleaving approach is the simplest way to utilize this information.

2.8.5 Derivation of the Upper Bound

Based on the proposed interleaver, each entity in the second stage interleaving can contain at most one erasured packet. Each codeword contains $n/N_1$ entities. Therefore, each codeword represents $(n/N_1)/N_2 = n/(N_1 N_2) = 1/w$ fraction of the total interleaver. Assume that after the second stage interleaving, erasured packets are uniformly distributed. The probability of an erasured packet drop into a particular codeword is equal to $1/w$. Therefore the probability of l out of m (total erasures) drop into a particular codeword becomes $$\binom{m}{l} \frac{1}{w^l} (1 - 1/w)^{m-l}. \tag{3}$$

With a code capable of correcting r erasures, the residual error becomes $$\sum_{l=r+1}^{n/N_1} \binom{m}{l} \frac{1}{w^l} (1 - 1/w)^{m-l}. \tag{4}$$

The reason that the summation runs up to $n/N_1$ instead of m is due to the fact there are at most $n/N_1$ erasured packets within these $n/N_1$ entities. For a general interleaver, the residual error becomes $$\sum_{l=r+1}^{m} \binom{m}{l} \frac{1}{w^l} (1 - 1/w)^{m-l}. \tag{5}$$

2.8.6 Single-LNB Advanced FEC Design Example

The following example illustrates the principle of selecting a specific FEC.

EXAMPLE 2

Assumption on Outage

Data rate: 1 Mbps

Second to resume reception on polarization change: 0.2 second

Worst-case seconds between polarization change when a user is "channel surfing": 1 second Maximum number of polarization changes in 30 seconds: 10

Reliability Requirement

At least a 98 percent of probability of correct reception of a 100 Mbyte file.

A 100 Mbytes file spans about 26.7 segments of 30 seconds data. Each data segment contains 2850 packets of length 10528 bits (seven MPEG-2 packets). It is further assumed that, at most, two such data segments experience up to 10 polarization shifts within 30 seconds (two worst-cases data segments), and the other segments experience up to one polarization shift within 30 seconds (average case).

Let $p_w$ denote the residual error of each FEC codeword after the FEC decoding for the worst-case data segment. The probability of correctly receiving 2850 packets within the entire 30-second data segment is equal to $$(1-P_w)^{2850/n}, \tag{6}$$

where n is the length of an FEC codeword in terms of packets. Similarly, the probability of correctly receiving a 30-second data segment with a single polarization shift is $$(1-P_a)^{2850/n}, \tag{7}$$

where $P_a$ is the residual error of each FEC in such data segment. The probability of correctly receiving the entire 100 Mbyte file becomes $$(1-P_w)^{2*2850/n}(1-P_a)^{24.7*2850/n}. \qquad (8)$$

With 98 percent of possibility to receive the whole 100 Mbytes file, $$(1-P_w)^{2*2850/n}(1-P_a)^{24.7*2850/n} \geq 0.98 \qquad (9)$$

Based on the outage assumptions, for r packet erasure correction FEC of length n packets, the residual error rate can be computed using Equation 2. For an FEC code correcting r packet erasures, apparently, the longer the code, the larger the residual error becomes because the erasure correction capability is reduced when compared with the number of information packets to be protected.

Table 3 shows the maximum length of the code to satisfying the reliability requirement.

TABLE 3

Maximum Code Length

| Maximum Length of FEC Satisfying the Reliability Constraint | Number of Erasures the FEC Can Correct | Percentage of Redundancy for a MDS Code |
|---|---|---|
| 85 | 15 | 18% |
| 140 | 20 | 14% |
| 195 | 25 | 13% |
| 255 | 30 | 12% |
| 315 | 35 | 11% |

2.8.7 Choice of Codes

Once the desired code parameters are derived, selection of a specific code is relatively straightforward. The following families of codes are particularly suitable for the present invention:

Phased burst correcting array codes: These codes consist of a binary array such that each packet is placed as one column, and the number of rows gives the length of the code in terms of packets. These codes are often MDS (maximum distance separable), which implies that r redundant parity packets can correct r erasures. These codes are described in detail in Mario Blaum and Ron M. Roth, "New Array Codes for Multiple Phased Burst Correction," *IEEE Transactions on Information Theory*, Vol. 39, No. 1, Jan. 1993, pp. 66–77; Mario Blaum and J. Bruck and A. Vardy, "MDS Array Codes with Independent Parity Symbols", *IEEE Transactions on Information Theory*, Vol. 42, No. 2, March 1996; and O. Keren and S. Litsyn, "A Class of Array Codes Correcting Multiple Column Erasures," *IEEE Transaction on Information Theory*, Vol. 43, No. 6, Nov. 1997.

General array code: Array error codes are constructed by combining other codes. The essence of an array code is that the combination is based on a geometric construction. For example, the simplest array code is the row-and-column code, consisting of a rectangular array of information bits with row and column parity check.

Reed-Solomom codes.

Low-density parity check code as described in John W. Byers, Michael Luby, and Michael Mitzenmacher, "Accessing Multiple Mirror Sites in Parallel: Using Tornado Codes to Speed Up Downloads," preprint.

Any cyclic code for burst error correction as described in S. Lin and D. J. Costello, Jr., "Error Control Coding: Fundamental and ApplicationsPrentice Hall, 1983.

EXAMPLE 3

Figure 13:
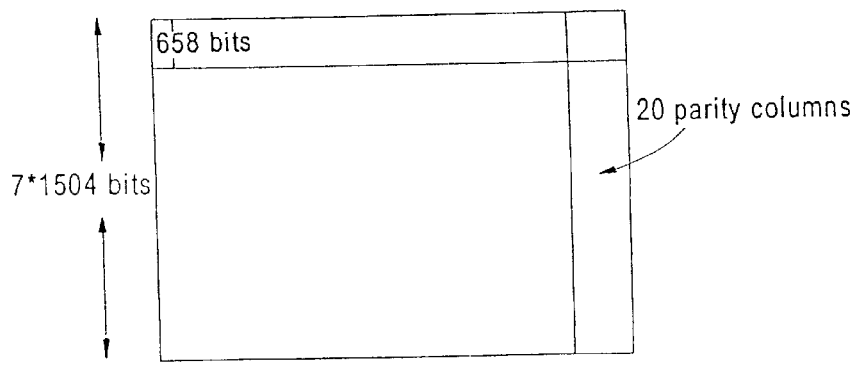
FIG. 13 illustrates an error correction code that works well with the interleaver illustrated in FIG. 12.

FIG. 13 illustrates a possible code design based on the interleaver disclosed above. Each packet (7 MPEG packets) is put into one column, adding 20 packet columns. We take a phased array code of length 140 and each column of 658 bits [3] with 20 parity check parity columns. The code is MDS, thus is capable of correcting 20 erasures.

Using Equation 2, we can compute the residual error rate for each FEC codeword after FEC decoding as listed in Table 4.

TABLE 4

Residual Error Rate for FEC Codeword

| Number of Polarization Shift Within 30 Seconds | Upper Bound on the Residual Error Rate After FEC decoding |
|---|---|
| 1 | 3.9E-28 |
| 2 | 4.2E-18 |
| 3 | 1.2E-13 |
| 4 | 6.9E-11 |
| 5 | 5.9E-9 |
| 6 | 1.7E-7 |
| 7 | 2.3E-6 |
| 8 | 2.0E-5 |
| 9 | 1.1E-4 |
| 10 | 4.8E-4 |

By using the same technique in Subsection 2.8.4, the residual error for 100 Mbyte file is equal to 0.0196. Note that this code has an overhead 20/140=14 percent. The code of length 315 to correct up to 35 packet erasures, shown in Table 3 could certainly be used, which will reduce the overhead to about 11 percent. This represents a tradeoff between efficiency and complexity since the decoding complexity per information bit grows linearly with the error correction capability. On the other hand, the FEC decoder need only run when there are lost packets within each codeword. There are about 320 FEC codewords within a 30-second interval. Therefore, even if there are polarization shifts, chances are that not all of them contain lost packets. However, even without lost packets, a deinterleaver must be run to place the packets back into their original places unless an upper layer protocol can rearrange them into the right order based on the sequence number embedded into each packet.

2.9 Options for the Use Packet-level FEC

Packet level-FEC may be applied either to the totality of data services or separately to various sets of data services or individually to each data service.

When applied to the totality of data services, the development of new applications or existing applications is made easier in that the FEC is performed automatically, and the application need not be modified to benefit from the use of the FEC. The downside of this is that the satellite data receiver must process the totality of the data services in order to be able to receive the subset of data services required by that satellite data receiver. Another downside is that all data services are burdened with FEC overhead.

The application of FEC encoding individually to data services has the desirable characteristic that a satellite data receiver may filter without processing data services that are not of interest to the satellite data receiver. It also has the benefit that some services may be transmitted that are tolerant of packet losses without the application of FEC. It has the downside that the receiver must individually keep FEC state information for each data service.

The application of FEC to sets of data services is another option that does not seem to provide any substantial benefits beyond those associated with the application of FEC individually to each data service.

Some broadcast applications involve the transmission of a brief broadcast announcement prior to the beginning of the transmission of a large block of data. With the present invention, the broadcast announcements must be sent sufficiently in advance of the larger block of data that the FEC code on the broadcast announcements has time to recover from lost packets. For these applications, a repeat transmission of broadcast announcements may be an acceptable form of FEC as the announcement consumes a relatively minor amount of system bandwidth.

2.9.1 Application of FEC to Data Services by Category of Service

This subsection defines the applicability of FEC to the various categories of digital satellite DTH data services.

Multicast file transfer—Protected by FEC transmission except perhaps if sent during a time of day when channel surfing is unlikely. The FEC must be strong enough to recover from worst-case packet loss as partial reception is worthless.

Carousel—Protected by FEC transmission except perhaps when the data is either repeatedly transmitted or where new versions of the data are transmitted on a frequent basis. Where FEC is used, it may be applied in such a way as to recover from typical rather than worst-case packet loss, as a repeat transmission can be used to recover from rare packet loss conditions.

Streaming media—Protected by FEC transmission.

Unicast Alert—Because an alert is a short message, packet-level FEC may not be justified. The overall loss rate for such alerts may be acceptable, given the relatively small fraction of time lost due to polarization tracking over a long period of time. Delayed repeat transmission may be used for cases where a lower packet loss rate is required.

2.10 Satellite Data Receiver Embodiment Block Diagrams

This section provides a view of the present invention by providing a discussion of the block diagram of the components within the preferred embodiments of the present invention.

2.10.1 Satellite Data Receiver Embodiment Block Diagram

Figure 14:
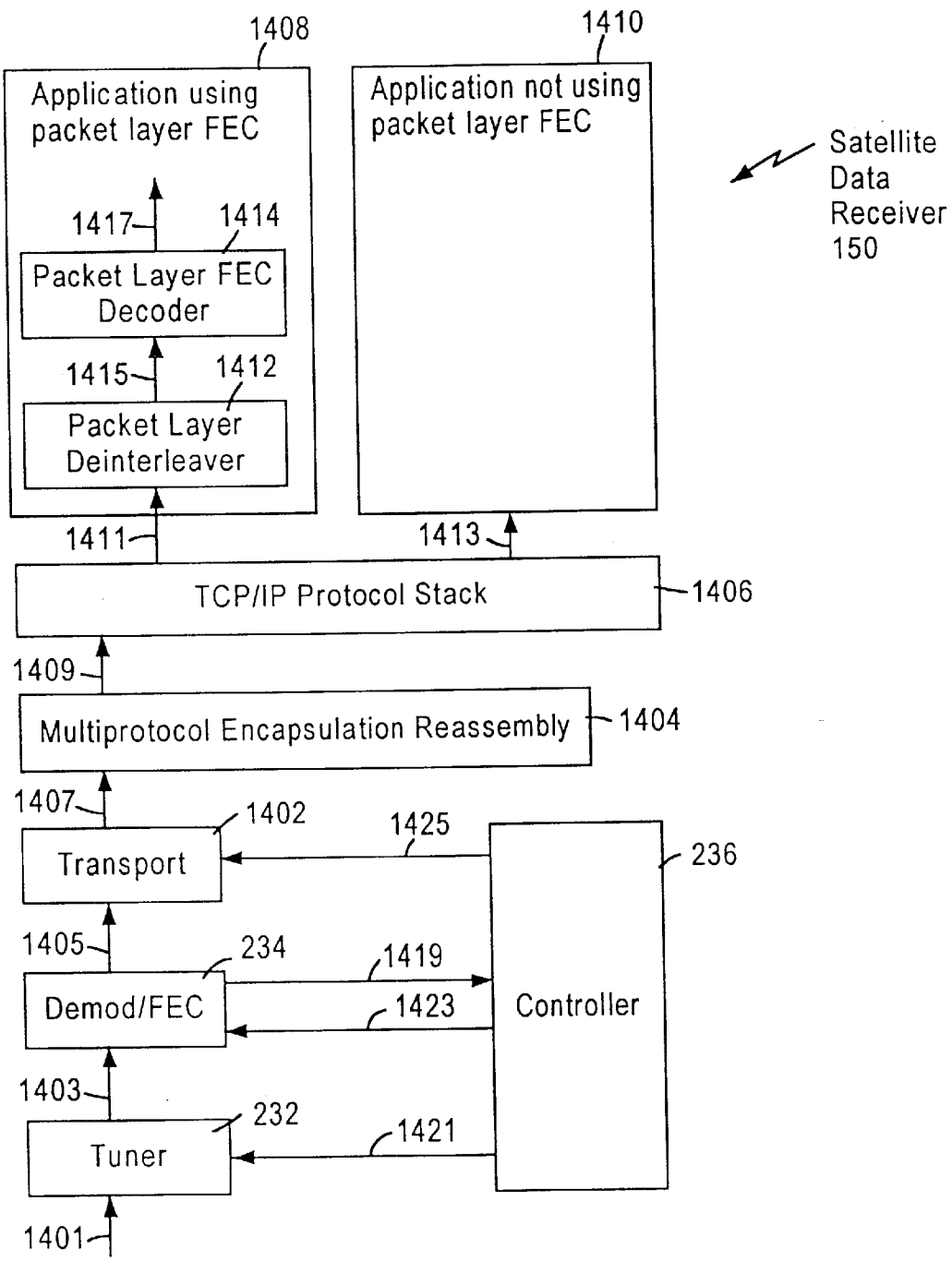
FIG. 14 illustrates the satellite data receiver in more detail in one embodiment of the present invention.

FIG. 14 illustrates the preferred embodiment of the satellite data receiver 150 in more detail and is representative of the satellite receiver part of the internet appliance 130' and network server 906 embodiments of the present invention.

Figure 2:
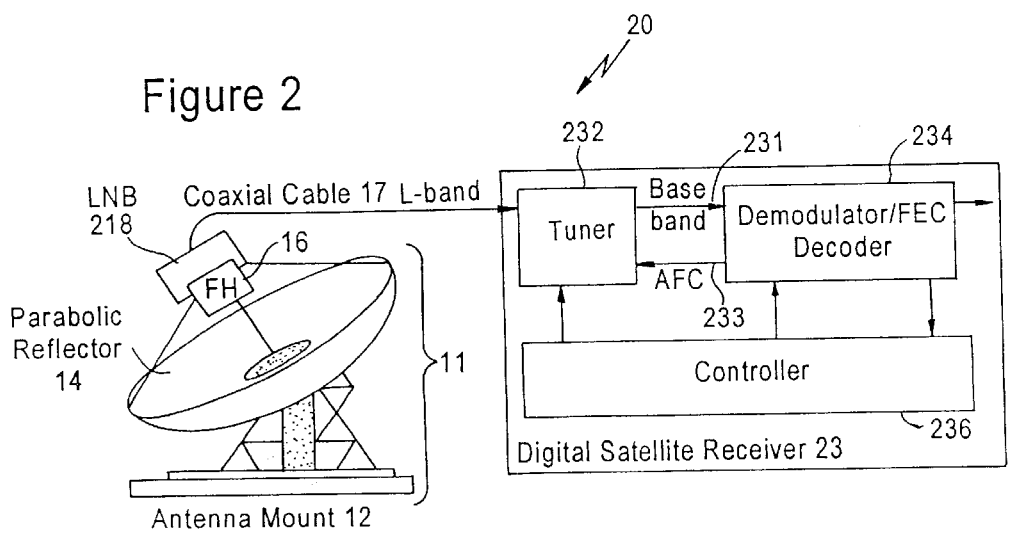
FIG. 2 illustrates the digital reception portion of a conventional digital satellite receiver.
Figure 3:
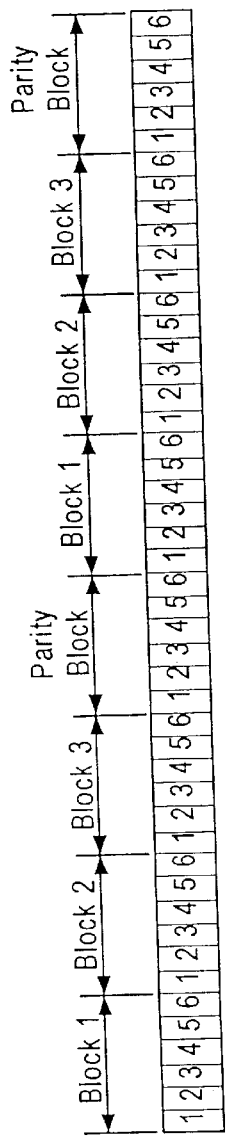
FIG. 3 illustrates a conventional blocked exclusive-OR parity forward error correction code (FEC).
Figure 4:
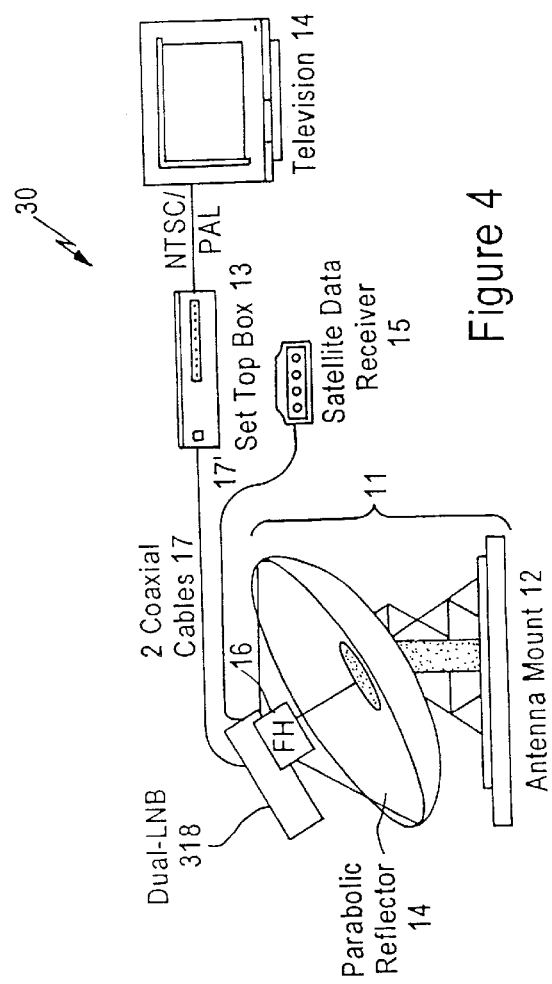
FIG. 4 illustrates a conventional home system which provides data and television reception.

The data flow in FIG. 14 is as follows:

1. L-band satellite receive signals 1401 are passed to the tuner 232 from the L-band splitter 502.
2. A single, filtered carrier 1403 is passed to the demod/FEC decoder 234.
3. A stream of received, digital bits 1405 are passed to a transport function 1402.
4. The transport function 1402 filters out all received MPEG packets except those on PIDs of interest to receiving applications and passes the resulting MPEG packets 1407 to the multiprotocol encapsulation reassembly function 1404.
5. For the case shown, where multiprotocol encapsulation is being performed, the multiprotocol encapsulation reassembly function 1404 reassembles complete IP packets 1409 and passes them to the TCP/IP stack 1406. When multiprotocol encapsulation is not being employed, the MPEG packets are either passed directly to the appropriate application (based on PID value) or passed to some other protocol stack which processes the packets prior to passing them to the appropriate application.
6. The TCP/IP stack 1406 filters out all received packets except those which have been indicated as being of interest to applications. These are user datagram protocol (UDP) packets 1411 containing, typically, a multicast address which has previously been enabled by an application and a destination port number for which an application has previously bound to a socket. UDP packets are forwarded either to an application 1408 which receives a packet-layer FEC encoded stream of UDP packets or
7. To an application 1410 which receives a stream of UDP packets 1413 which do not have packet-layer FEC.
8. The de-interleaver 1412 reassembles interleaving blocks 1415 (as described earlier) returning the block's packets to their pre-interleaving order and forwards them to the packet layer FEC decoder 1414.
9. The packet layer FEC decoder 1414 restores as many lost packets as it can and forwards the resulting set of UDP packets 1417 to the application.
10. As discussed in conjunction with FIG. 2, the controller 236 monitors acquisition status 1419 from the demod/FEC decoder 234 and adjusts the tuner parameters 1421, demod/FEC decoder parameters 1423 and transport parameters 1425 as necessary to support continued reception in the face of polarization shifts initiated by the external video set top box 130.

In the preferred embodiment of the present invention, the tuner 232, demod/FEC decoder 234 and transport 1402 functions are implemented in hardware while the multiprotocol encapsulation reassembly, TCP/IP protocol stack 1406, packet layer de-interleaver 1412, packet layer decoder 1414, applications 1408, 1410 and controller 236 are implemented by software running on one or more microprocessors.

2.10.2 Separate Satellite Data Receiver Controller Embodiment Block Diagram

Figure 15:
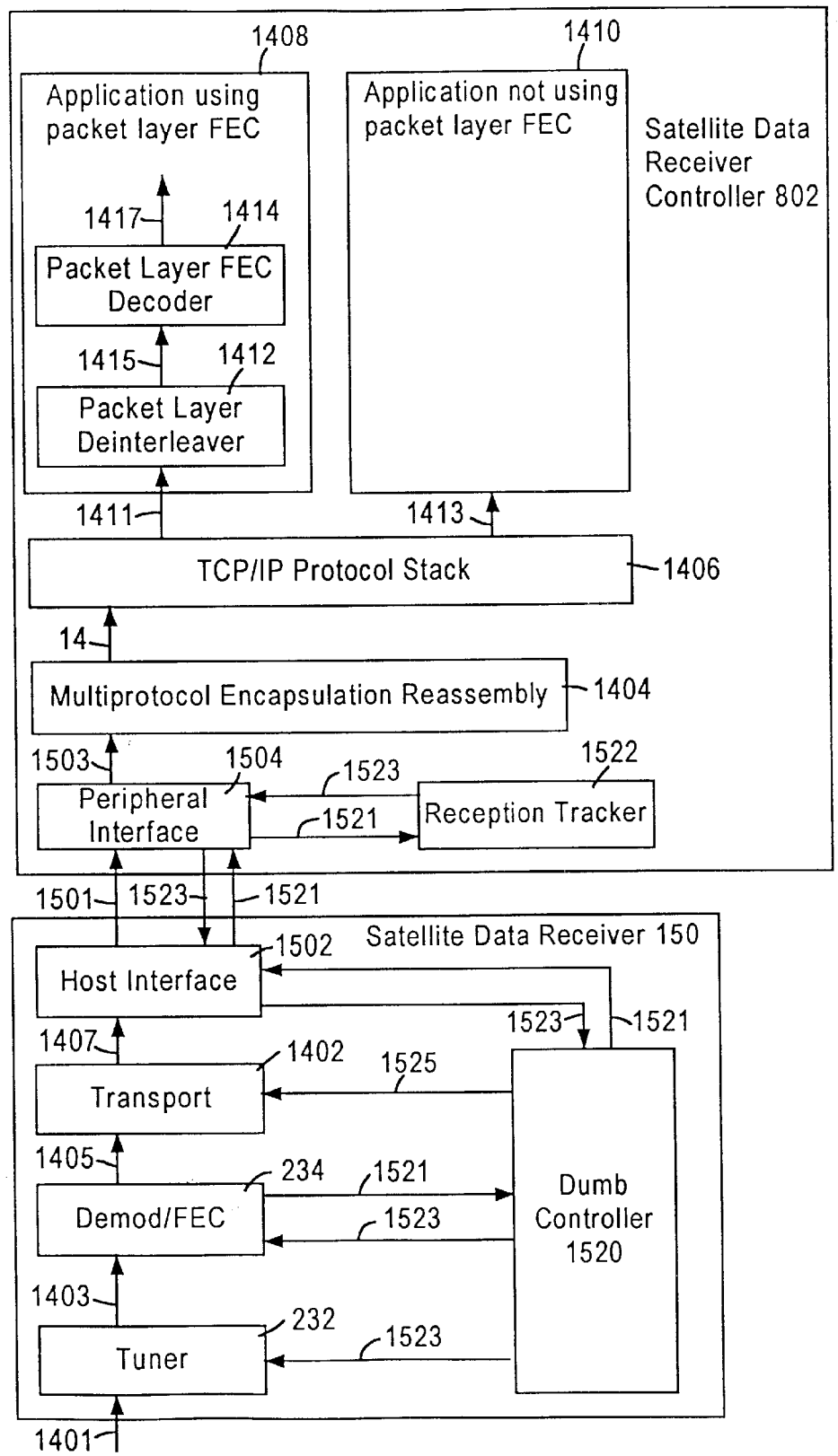
FIG. 15 illustrates the satellite data receiver controller in more detail in one embodiment of the present invention.

FIG. 15 illustrates the separate satellite data receiver controller 802 embodiment of the present invention. FIG. 15 is representative of the satellite receiver portion of the PC peripheral embodiment of the present invention.

As discussed earlier, the receiver configuration includes a satellite data receiver 150 and a separate satellite data receiver controller 802.

The data flow in FIG. 15 is as follows:

1. L-band satellite receive signals 1401 are passed to the tuner 232 from the L-band splitter 502.
2. A single, filtered carrier 1403 is passed to the demod/FEC decoder 234.
3. A stream of received, digital bits 1405 are passed to the transport function 1402.
4. The transport function 1402 filters out all received MPEG packets except those on PIDs of interest to receiving applications. In the preferred embodiment, the multiprotocol encapsulation reassembly 1404 is performed within the satellite data receiver controller 802. In other embodiments this function may be done within the satellite data receiver 150. In the preferred embodiment, the transport function 1402 passes MPEG packets 1407 which pass the PID filter to the host interface 1502.
5. The host interface 1502 allows received packets 1501 to pass across a communications channel between the satellite data receiver 150 and the satellite data receiver controller 802. In the preferred embodiment, this communications channel is the Universal Serial Bus commonly used for connecting peripherals to personal computers. Other embodiments include 1394 Firewire, Ethernet, Home LAN, Bluetooth, PCI and other commonly used local area or peripheral standards. The host interface 1502 passes the packets from the transport to the satellite data receiver controller 802.

6. The peripheral interface 1504 passes packets 1503 received from the satellite data receiver 150 to the multiprotocol encapsulation reassembly function 1404.
7. For the case shown, where multiprotocol encapsulation is being performed, the multiprotocol encapsulation reassembly function 1404 reassembles complete IP packets 1409 and passes them to the TCP/IP stack 1406. When multiprotocol encapsulation is not being employed, the MPEG packets are either passed directly to the appropriate application (based on PID value) or passed to some other protocol stack which processes the packets prior to passing them to the appropriate application.
8. The TCP/IP stack 1406 filters out all received packets except those which have been indicated as being of interest to applications. These are UDP packets 1411 containing, typically, a multicast address which has previously been enabled by an application and a destination port number which an application has previously bound to a socket. UDP packets are forwarded either to an application 1408 which receives a packet-layer FEC encoded stream or
9. To an application 1410 which receives a stream of UDP packets 1413 which do not have packet-layer FEC.
10. The de-interleaver 1412 reassembles interleaving blocks 1415 (as described earlier) returning a block's packets to their pre-interleaving order and forwards them to the packet layer FEC decoder 1414.
11. The packet layer FEC decoder 1414 restores as many lost packets as it can and forwards the resulting set of UDP packets 1417 to the application 1408.

The control of the satellite data receiver 150 is as follows:
12. The demod/FEC decoder 234 passes the acquisition status 1521 to the satellite data receiver's dumb controller 1520 which is so named as it does not have the intelligence necessary to track changes in polarization.
13. The dumb controller 1520 passes the acquisition status 1521 to the host interface 1502 for transmission to the satellite data receive controller 802.
14. The host interface 1502 passes the acquisition status to the satellite data receiver controller 802.
15. The peripheral interface 1504 passes the acquisition status 1521 to the reception tracker 1522 within the satellite data receiver controller 802.
16. The reception tracker 1522 monitors acquisition status 1521, as discussed earlier, and when appropriate to track changes in polarization passes revised acquisition parameters 1523 to the peripheral interface 1504 for transmission to the satellite data receiver 150.
17. The peripheral interface 1504 passes the revised acquisition parameters 1523 to the satellite data receiver 150.
18. The host interface 1502 passes the revised acquisition parameters 1523 to the dumb controller 1520.
19. The dumb controller 1520 passes transport parameters 1525 contained within the revised acquisition parameters 1523 to the transport function 1402.
20. The dumb controller 1520 passes the revised acquisition parameters 1523 to the demod/FEC decoder 234.
21. The dumb controller 1520 passes the revised acquisition parameters 1523 to the tuner 232. In the preferred embodiment, the satellite data receiver 150 is an unmodified off-the-shelf satellite data receiver. As such, the dumb controller 1520 will interact with the tuner 232 and demod/FEC decoder 234 as necessary to step through a range of frequencies in order to acquire the signal using the revised acquisition parameters from the satellite data receiver controller 802.

In the preferred embodiment of the present invention, the peripheral interface 1504 is the only function implemented in hardware within the satellite data receiver controller 802. The other functions are all implemented in software running on one or more microprocessors. Within the satellite data receiver 150 the tuner 232, demod/FEC decoder 234 and transport functions 1402 are implemented in hardware while the dumb controller is implemented by software running on one or more microprocessors.

In the embodiment illustrated in FIG. 15, the FEC decoding, including de-interleaving and the reception tracking are performed in the satellite data receiver controller 802. However, one or both of these functions could be performed in the satellite data receiver 150 of FIG. 15.

The various embodiments of the present invention provide a major improvement over prior art satellite data receivers that are intended to provide data services to existing users of DTH TV in that it:
1. Reduces installation cost
2. Enables a truly consumer-installable satellite data receiver The satellite data receiver and satellite data receiver controller are described above as distinct entities. However, as known to one of ordinary skill in the art, both the satellite data receiver and the satellite data receiver controller could be integrated with other entities, their functionality being implemented on cards and/or chips in either hardware or software. Such modifications would be routine to one of ordinary skill in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A satellite data receiver, connectable to a single low-noise block (LNB) and another satellite data receiver, said satellite data receiver comprising:

a controller capable of receiving polarization information from the another satellite data receiver and controlling a flow of data from the single low-noise block (LNB) and processing the polarization information from the another satellite receiver such that said satellite data receiver receives at least a portion of the data from the single low-noise block (LNB).

2. The satellite data receiver of claim 1, said controller processing the polarization information from the another satellite data receiver by tracking the another satellite data receiver's polarization selection signals and said controller controlling the flow of the data simulcast on carriers on each polarization from the single low-noise block (LNB).

3. The satellite data receiver of claim 1, said controller processing the polarization information from the another satellite data receiver by searching for a simulcast transmission on receive parameters for multiple carriers, one on each polarization.

4. The satellite data receiver of claim 1, said controller processing the polarization information from the another satellite data receiver by either passing the polarization information from the another satellite data receiver to the single low-noise block (LNB) or by overriding the polarization information provided by the another satellite data receiver.

5. The satellite data receiver of claim 1, said satellite data receiver further being connectable to a satellite data receiver controller including a reception tracker that tracks said satellite data receiver's acquisition status and sets receive parameters of said satellite data receiver such that the receive parameters of said satellite data receiver track polarization shifts in the another satellite data receiver and allow reception of the at least a portion of the data from the single low-noise block (LNB).

6. The satellite data receiver of claim 1, further comprising:

an error-correction decoder for recovering from data errors occurring when the another satellite data receiver changes polarization.

7. The satellite data receiver of claim 6, wherein said error-correction decoder utilizes one of repeat transmission, exclusive-OR parity codes, blocked exclusive-OR parity codes, phased burst correcting array codes, general array codes, Reed-Solomon codes, a low-density parity check code, and a cyclic code.

8. The satellite data receiver of claim 2, wherein said satellite data receiver is connected to the single low-noise block (LNB) and the another satellite data receiver by an L-band splitter.

9. The satellite data receiver of claim 3, wherein said satellite data receiver is connected to the single low-noise block (LNB) and the another satellite data receiver by an L-band splitter.

10. The satellite data receiver of claim 4, wherein said satellite data receiver is connected between the single low-noise block (LNB) and the another satellite data receiver.

11. The satellite data receiver of claim 5, wherein said satellite data receiver is connected to the single low-noise block (LNB) and the another satellite data receiver by a Y-adapter and connected between the Y-adapter and the satellite data receiver controller.

12. The satellite data receiver of claim 1, wherein said satellite data receiver is one of a settop box, a universal serial bus satellite data receiver, and a network server.

13. A method of changing polarization in a satellite data receiver, comprising:

receiving polarization information from another satellite data receiver;

receiving signal data; and processing the polarization information such that the satellite data receiver receives at least a portion of the signal data.

14. The method of claim 13, said processing step including, tracking the another satellite data receiver's polarization selection signals and controlling a flow of the signal data simulcast on carriers on each polarization.

15. The method of claim 13, said processing step including, processing the polarization information from the another satellite data receiver by searching for a simulcast transmission on receive parameters for multiple carriers, one on each polarization.

16. The method of claim 13, said processing step including, processing the polarization information from the another satellite data receiver by either passing the polarization information from the another satellite data or by overriding the polarization information provided by the another satellite data receiver.

17. The method of claim 13, said processing step including, tracking the satellite data receiver's acquisition status and setting receive parameters of the satellite data receiver such that the receive parameters of the satellite data receiver track polarization shifts in the another satellite data receiver and allow reception of the at least a portion of the signal.

18. The method of claim 13, said processing step including, recovering from data errors occurring when the another satellite data receiver changes polarization.

19. The method of claim 18, wherein said recovering step utilizes one of repeat transmission, exclusive-OR parity codes, blocked exclusive-OR parity codes, phased burst correcting array codes, general array codes, Reed-Solomon codes, a low-density parity check code, and a cyclic code.

20. A computer program embodied on a computer-readable medium for changing polarization in a satellite data receiver comprising:

a receiving code segment for receiving polarization information from another satellite data receiver and for receiving signal data; and a processing code segment for processing the polarization information such that the satellite data receiver receives at least a portion of the signal data.

21. The computer program of claim 20, said processing code segment including, a tracking code segment for tracking the another satellite data receiver's polarization selection signals and a controlling code segment for controlling a flow of the signal data simulcast on carriers on each polarization.

22. The computer program of claim 20, said processing code segment processing the polarization information from the another satellite data receiver by searching for a simulcast transmission on receive parameters for multiple carriers, one on each polarization.

23. The computer program of claim 20, said processing code segment processing the polarization information from the another satellite data receiver by either passing the polarization information from the another satellite data or by overriding the polarization information provided by the another satellite data receiver.

24. The computer program of claim 20, said processing code segment including, a tracking code segment for tracking the satellite data receiver's acquisition status and a setting code segment for setting receive parameters of the satellite data receiver such that the receive parameters of the satellite data receiver track polarization shifts in the another satellite data receiver and allow reception of the at least a portion of the signal.

25. The computer program of claim 20, said processing code segment including, an error recovery code segment for recovering from data errors occurring when the another satellite data receiver changes polarization.

26. The computer program of claim 25, wherein said error recovery code segment utilizes one of repeat transmission, exclusive-OR parity codes, blocked exclusive-OR parity codes, phased burst correcting array codes, general array codes, Reed-Solomon codes, a low-density parity check code, and a cyclic code.

27. A computer signal for changing polarization in a satellite data receiver comprising:

a receiving code segment for receiving polarization information from another satellite data receiver and for receiving signal data; and a processing code segment for processing the polarization information such that the satellite data receiver receives at least a portion of the signal data.

28. The computer signal of claim 27, said processing code segment including, a tracking code segment for tracking the another satellite data receiver's polarization selection signals and a controlling code segment for controlling a flow of the signal data simulcast on carriers on each polarization.

29. The computer signal of claim 27, said processing code segment processing the polarization information from the another satellite data receiver by searching for a simulcast transmission on receive parameters for multiple carriers, one on each polarization.

30. The computer signal of claim 27, said processing code segment processing the polarization information from the another satellite data receiver by either passing the polarization information from the another satellite data or by overriding the polarization information provided by the another satellite data receiver.

31. The computer signal of claim 27, said processing code segment including, a tracking code segment for tracking the satellite data receiver's acquisition status and a setting code segment for setting receive parameters of the satellite data receiver such that the receive parameters of the satellite data receiver track polarization shifts in the another satellite data receiver and allow reception of the at least a portion of the signal.

32. The computer signal of claim 27, said processing code segment including, an error recovery code segment for recovering from data errors occurring when the another satellite data receiver changes polarization.

33. The computer signal of claim 28, wherein said error recovery code segment utilizes one of repeat transmission, exclusive-OR parity codes, blocked exclusive-OR parity codes, phased burst correcting array codes, general array codes, Reed-Solomon codes, a low-density parity check code, and a cyclic code.

34. A satellite data receiver controller, connectable to a first and second satellite data receiver, the first satellite data receiver receiving polarization information from the second satellite data receiver and controlling a flow of data from a single low-noise block (LNB) and processing the polarization information from the second satellite receiver such that the first satellite data receiver receives at least a portion of the data from the single low-noise block (LNB), said satellite data receiver controller comprising:

a reception tracker that tracks the first satellite data receiver's acquisition status and sets receive parameters of the first satellite data receiver such that the receive parameters of the first satellite data receiver track polarization shifts in the second satellite data receiver and allow reception of the at least a portion of the data from the single low-noise block (LNB).

35. The satellite data receiver controller of claim 34, further comprising:

an error-correction decoder for recovering from data errors occurring when the another satellite data receiver changes polarization.

36. The satellite data receiver controller of claim 35, wherein said error-correction decoder utilizes one of repeat transmission, exclusive-OR parity codes, blocked exclusive-OR parity codes, phased burst correcting array codes, general array codes, Reed-Solomon codes, a low-density parity check code, and a cyclic code.

37. The satellite data receiver controller of claim 34, wherein the first satellite data receiver is connected to the single low-noise block (LNB) and the second satellite data receiver by a Y-adapter and connected between the Y-adapter and the satellite data receiver controller.

38. The satellite data receiver controller of claim 34, wherein the first satellite data receiver is one of a settop box, a universal serial bus satellite data receiver, and a network server.

39. A method of changing polarization in a satellite data receiver controller, comprising:

receiving polarization information from a first satellite data receiver;

receiving signal data; and tracking the first satellite data receiver's acquisition status and setting receive parameters of a second satellite data receiver such that the receive parameters of the second satellite data receiver track polarization shifts in the first satellite data receiver and allow reception of the at least a portion of the signal.

40. The method of claim 39, further comprising:

recovering from data errors occurring when the first satellite data receiver changes polarization.

41. The method of claim 40, wherein said recovering step utilizes one of repeat transmission, exclusive-OR parity codes, blocked exclusive-OR parity codes, phased burst correcting array codes, general array codes, Reed-Solomon codes, a low-density parity check code, and a cyclic code.

42. A computer program embodied on a computer-readable medium residing in a satellite data receiver controller for changing polarization in a first satellite data receiver comprising:

a receiving code segment for receiving polarization information from a second satellite data receiver; and a tracking code segment for tracking the second satellite data receiver's acquisition status and a setting code segment for setting receive parameters of the first satellite data receiver such that the receive parameters of the first satellite data receiver track polarization shifts in the second satellite data receiver and allow reception of the at least a portion of the signal.

43. The computer program of claim 42, further comprising:

an error recovery code segment for recovering from data errors occurring when the first satellite data receiver changes polarization.

44. The computer program of claim 43, wherein said error recovery code segment utilizes one of repeat transmission, exclusive-OR parity codes, blocked exclusive-OR parity codes, phased burst correcting array codes, general array codes, Reed-Solomon codes, a low-density parity check code, and a cyclic code.

45. A computer signal for changing polarization in a satellite data receiver comprising:

a receiving code segment for receiving polarization information from a second satellite data receiver; and a tracking code segment for tracking the second satellite data receiver's acquisition status and a setting code segment for setting receive parameters of the first satellite data receiver such that the receive parameters of the first satellite data receiver track polarization shifts in the second satellite data receiver and allow reception of the at least a portion of the signal.

46. The computer signal of claim 45, further comprising:

an error recovery code segment for recovering from data errors occurring when the first satellite data receiver changes polarization.

47. The computer signal of claim 46, wherein said error recovery code segment utilizes one of repeat transmission, exclusive-OR parity codes, blocked exclusive-OR parity codes, phased burst correcting array codes, general array codes, Reed-Solomon codes, a low-density parity check code, and a cyclic code.

* * * * *